US012782251B2

(12) United States Patent
Hennen et al.

(10) Patent No.: US 12,782,251 B2
(45) Date of Patent: Nov. 3, 2026

(54) DYNAMIC TESTING SYSTEM HYDRAULIC ACTUATOR SPEED CONTROL

(71) Applicant: ILLINOIS TOOL WORKS INC., Glenview, IL (US)

(72) Inventors: James Hennen, Plymouth, MN (US); Bruce Anderson, Minneapolis, MN (US); Stephen Zachman, St. Louis Park, MN (US); Tom Byron, Cottage Grove, MN (US); Ian Kugel, Bloomington, MN (US); Matt Schon, Plymouth, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 226 days.

(21) Appl. No.: 18/816,771

(22) Filed: Aug. 27, 2024

(65) Prior Publication Data

US 2025/0076166 A1 Mar. 6, 2025

Related U.S. Application Data

(60) Provisional application No. 63/535,910, filed on Aug. 31, 2023.

(51) Int. Cl.
*G01N 3/02* (2006.01)
*G01N 3/10* (2006.01)
*G05D 7/06* (2006.01)

(52) U.S. Cl.
CPC ................. *G01N 3/02* (2013.01); *G01N 3/10* (2013.01); *G05D 7/0635* (2013.01)

(58) Field of Classification Search
CPC .......... G01N 3/02; G01N 3/10; G05D 7/0635; F15B 9/00; F15B 19/00; F15B 2211/328;
(Continued)

(56) References Cited

U.S. PATENT DOCUMENTS 1,967,107 A 7/1934 Thurston
4,635,682 A 1/1987 Walters
(Continued)

FOREIGN PATENT DOCUMENTS

DE 102009055979 A1 6/2010
DE 102012009136 A1 11/2013
(Continued)

OTHER PUBLICATIONS

Office Action in corresponding Japanese Patent Application Serial No. 2024-148162 dated Jan. 6, 2026.
(Continued)

*Primary Examiner* — Thomas M Hammond, III
(74) *Attorney, Agent, or Firm* — Steven M. Koehler; Westman, Champlin & Koehler, P.A.

(57) ABSTRACT

In a method of controlling a hydraulic actuator of a test station, a differential signal is generated based on a difference between a reference signal and a feedback signal using an actuator controller. A flow rate control circuit is set in one of a first state and a second state based on a flow rate attenuation signal. The differential signal is delivered to the control valve as an actuator command signal when the flow rate control circuit is in the first state. An attenuated differential signal is delivered to the control valve as the actuator command signal when the flow rate control circuit is in the second state. A flow rate and a direction of the hydraulic fluid flow is controlled based on the actuator command signal. The flow rate corresponding to the attenuated differential signal is less than the flow rate corresponding to the differential signal.

20 Claims, 5 Drawing Sheets

(58) Field of Classification Search

CPC ...... F15B 2211/6654; F15B 2211/6658; F15B 9/09; F15B 21/082; F15B 2211/7053; F15B 21/087; F15B 19/005; F15B 2211/76; F15B 2211/7656; F15B 2211/8752; F15B 20/00; F15B 2013/0409; F15B 2211/6303; F15B 2211/6336; F15B 2211/634; F15B 2211/6656; F15B 2211/85; F15B 2211/86; F15B 21/02; F15B 13/02; F15B 11/024; F15B 2211/30; G01M 99/007; G01M 7/00; G01M 17/00; G05B 19/042

See application file for complete search history.

(56) References Cited

U.S. PATENT DOCUMENTS

| | | | | |
|---|---|---|---|---|
| 5,109,672 | A | | 5/1992 | Chenoweth et al. |
| 5,190,446 | A | | 3/1993 | Salter et al. |
| 5,240,403 | A | | 8/1993 | McAnespie |
| 5,988,989 | A | | 11/1999 | Hobson |
| 7,281,431 | B2 | | 10/2007 | Englund et al. |
| 7,421,938 | B2 | | 9/2008 | Kah |
| 8,955,397 | B2 | | 2/2015 | Saari et al. |
| 9,488,163 | B2 | | 11/2016 | Caldwell et al. |
| 9,853,523 | B2 | | 12/2017 | Caron et al. |
| 10,550,860 | B2 | | 2/2020 | Perkins et al. |
| 11,009,048 | B1 | | 5/2021 | Neumann et al. |
| 2006/0222509 | A1 | | 10/2006 | Kah |
| 2007/0051184 | A1 | | 3/2007 | Englund et al. |
| 2007/0209445 | A1 | | 9/2007 | Bohr et al. |
| 2014/0142759 | A1 | | 5/2014 | Schulz |
| 2015/0160108 | A1 | | 6/2015 | Kimura |
| 2016/0025114 | A1 | | 1/2016 | Perkins et al. |
| 2016/0123355 | A1 | | 5/2016 | Collins |
| 2016/0290368 | A1 | | 10/2016 | Collins |
| 2017/0089365 | A1 | | 3/2017 | Perkins et al. |
| 2018/0164821 | A1 | | 6/2018 | Litz et al. |
| 2018/0274526 | A1 | | 9/2018 | Guender |
| 2019/0204193 | A1 | * | 7/2019 | Ramasubbu ............. G01N 3/10 |
| 2019/0211849 | A1 | | 7/2019 | Rampen et al. |
| 2019/0376533 | A1 | | 12/2019 | Perkins et al. |
| 2021/0180577 | A1 | | 6/2021 | King et al. |
| 2021/0254642 | A1 | | 8/2021 | Stefani et al. |
| 2024/0344532 | A1 | | 10/2024 | Squires |
| 2024/0369082 | A1 | | 11/2024 | Squires |

FOREIGN PATENT DOCUMENTS

| | | | | | |
|---|---|---|---|---|---|
| DE | 112012001035 | T5 | * | 11/2013 | ............ F15B 21/087 |
| DE | 102013005416 | A1 | | 10/2014 | |
| EP | 0098719 | A2 | | 1/1984 | |
| EP | 0361927 | B1 | | 4/1990 | |
| JP | S62-74595 | A | | 4/1987 | |
| JP | 2003-156005 | A | | 5/2003 | |
| JP | 2011-064583 | A | | 3/2011 | |
| JP | 2011-185755 | A | | 9/2011 | |
| JP | 2013-068492 | A | | 4/2013 | |
| JP | 7189801 | B2 | | 12/2022 | |
| JP | 2023-106145 | A | | 8/2023 | |
| KR | 20190129963 | A | * | 11/2019 | ............. F15B 11/04 |
| WO | 2012176132 | A1 | | 12/2012 | |
| WO | 2020167782 | A1 | | 8/2020 | |

OTHER PUBLICATIONS

Office Action in corresponding Korean Patent Application Serial No. 10-2024-0116654 dated May 28, 2026.

"MTS SilentFlo 515 Hydraulic Power Units", MTS Systems Brochure, Mar. 2023, 12 pages.

Search Report in corresponding European Application Serial No. 24197230.6 dated Feb. 5, 2025.

Office Action in corresponding Japanese patent application serial No. 2024-148162 dated Jun. 8, 2026.

* cited by examiner

DYNAMIC TESTING SYSTEM HYDRAULIC ACTUATOR SPEED CONTROL

CROSS-REFERENCE TO RELATED APPLICATION

The present application is based on and claims the benefit of U.S. provisional application Ser. No. 63/535,910, filed Aug. 31, 2023, the content of which is hereby incorporated by reference in its entirety.

FIELD

Embodiments of the present disclosure generally relate to test stations of dynamic testing systems and, more particularly, to speed control of a hydraulic actuator of a test station.

BACKGROUND

Dynamic testing systems, such as those developed by MTS Systems Corporation, include test stations that perform various tests through the application of loads and displacements to a test subject using hydraulic actuators. Test stations may include, for example, a vehicle testing station that applies simulated driving conditions to a mobile vehicle, or a building testing station that applies simulated seismic activity to a building.

The actuators of the test stations are driven by hydraulic fluid flows. The actuations performed by each actuator are controlled using a control valve (e.g., proportional control valve) that regulates the flow rate and direction of the hydraulic fluid flow through the actuator.

For safety reasons, workers are generally blocked from entering the test station during the performance of a test. An input safety valve that controls the high pressure flow of hydraulic fluid to the test station may be placed in a low-flow state that limits the flow rate of the hydraulic fluid to the test station and its actuators. As a result, when the safety valve is in the low-flow state, the speed at which the actuators move is highly reduced and may allow for workers to safely enter the test station and inspect test actuations performed by the actuators, for example.

Such input safety valves inherently impose pressure drops in the system. These pressure drops must be overcome during normal operation through the higher pressurization of the hydraulic fluid resulting in reduced energy efficiency. Furthermore, such input safety valves generally only provide a single safety layer from the actuators being driven at a higher speed than desired.

SUMMARY

Embodiments of the present disclosure relate to methods of controlling a hydraulic actuator of a test station of a dynamic testing system and a test station configured to perform the methods. The method is implemented in a test station that includes, a hydraulic actuator configured to drive an actuation of a test subject using a hydraulic fluid flow, a control valve, an actuation sensor, a test controller, an actuator controller, and a flow rate control circuit. In the method, a feedback signal indicative of a parameter of the actuation is generated using the actuation sensor. A reference signal indicative of a desired actuation based on a test program is generated using the test controller. A differential signal based on a difference between the reference signal and the feedback signal is generated using the actuator controller. The flow rate control circuit is set in one of a first state and a second state based on a flow rate attenuation signal. The differential signal is delivered to the control valve as an actuator command signal when the flow rate control circuit is in the first state. An attenuated differential signal is delivered to the control valve as the actuator command signal when the flow rate control circuit is in the second state. A flow rate and a direction of the hydraulic fluid flow is controlled based on the actuator command signal. The flow rate corresponding to the attenuated differential signal is less than the flow rate corresponding to the differential signal.

In some embodiments of the method, the flow rate corresponding to the attenuated differential signal is a non-zero flow rate.

In some embodiments of the method, the non-zero flow rate is less than about 20% of the flow rate corresponding differential signal.

In some embodiments of the method, the non-zero flow rate limits a movement of an actuator rod of the hydraulic actuator that drives the actuation to less than approximately 15 millimeters per second.

In some embodiments of the method, the flow rate corresponding to the attenuated differential signal is substantially zero and substantially clamps a position of an actuator rod that drives the actuation.

In some embodiments of the method, the hydraulic actuator comprises a cylinder and an actuator rod including a piston contained within the cylinder, wherein movement of the piston and the actuator rod relative to the cylinder drives the actuation.

In some embodiments, the control valve comprises a valve housing including an inlet port coupled to a supply of high pressure hydraulic fluid, an outlet port coupled to a low pressure return reservoir, a first port coupled to a first working volume formed by an interior of the cylinder and the piston and a second port coupled to a second working volume formed by the interior of the cylinder and the piston. The control valve may also include a valve body contained within the housing having a position that directs the hydraulic fluid flow received at the inlet port to one of the first and second ports or neither of the first and second ports and controls a flow rate of the hydraulic fluid flow, and a valve body driver configured to adjust the position of the valve body based on the actuator command signal.

In some embodiments of the method, the valve body driver comprises a servo or a solenoid.

In some embodiments of the method, the valve body comprises a spool or a piston.

In some embodiments of the method, the actuation comprises a movement of the test subject, the actuation sensor comprises a displacement sensor, and the feedback signal indicates a displacement or movement of the test subject.

In some embodiments of the method, the actuation comprises a force on the test subject, the actuation sensor comprises a load cell, and the feedback signal indicates a force applied to the test subject.

In some embodiments, the method includes generating the flow rate attenuation signal using the test controller.

In some embodiments, the method includes attenuating the differential signal to form the attenuated differential signal using the flow rate control circuit.

One embodiment of the test station includes a hydraulic actuator configured to drive an actuation of a test subject using a hydraulic fluid flow, a control valve configured to control a flow rate and a direction of the hydraulic fluid flow and the actuation in response to an actuator command signal, an actuation sensor configured to generate a feedback signal that is indicative of a parameter of the actuation, a test controller configured to generate a reference signal corresponding to a desired actuation based on a test program, an actuator controller configured to generate a differential signal based on a difference between the reference signal and the feedback signal, and a flow rate control circuit. The flow rate control circuit includes a first state, in which the flow rate control circuit is configured to deliver the differential signal to the control valve as the actuator command signal, and a second state, in which the flow rate control circuit is configured to deliver an attenuated differential signal to the control valve as the actuator command signal. The flow rate control circuit is transitioned from the first state to the second state in response to a flow rate attenuation signal. The flow rate corresponding to the attenuated differential signal is less than the flow rate corresponding to the differential signal.

In some embodiments of the test station, the flow rate corresponding to the attenuated differential signal is a non-zero flow rate.

In some embodiments of the test station, the non-zero flow rate is less than about 20% of the flow rate corresponding differential signal.

In some embodiments of the test station, the non-zero flow rate limits a movement of an actuator rod of the hydraulic actuator that drives the actuation to less than approximately 15 millimeters per second.

In some embodiments of the test station, the flow rate corresponding to the attenuated differential signal is substantially zero and clamps a position of an actuator rod that drives the actuation.

In some embodiments of the test station, the hydraulic actuator comprises a cylinder and an actuator rod including a piston contained within the cylinder, wherein movement of the piston and the actuator rod drives the actuation.

In some embodiments, the control valve comprises a valve housing including an inlet port coupled to a supply of high pressure hydraulic fluid, an outlet port coupled to a low pressure return reservoir, a first port coupled to a first working volume formed by an interior of the cylinder and the piston and a second port coupled to a second working volume formed by the interior of the cylinder and the piston. The control valve may also include a valve body contained within the housing having a position that directs the hydraulic fluid flow received at the inlet port to one of the first and second ports or neither of the first and second ports and controls a flow rate of the hydraulic fluid flow, and a valve body driver configured to adjust the position of the valve body based on the actuator command signal.

In some embodiments of the test station, the valve body driver comprises a servo or a solenoid.

In some embodiments of the test station, the valve body comprises a spool or a piston.

In some embodiments of the test station, the actuation comprises a movement of the test subject, the actuation sensor comprises a displacement sensor, and the feedback signal indicates a displacement or movement of the test subject.

In some embodiments of the test station, the actuation comprises a force on the test subject, the actuation sensor comprises a load cell, and the feedback signal indicates a force applied to the test subject.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
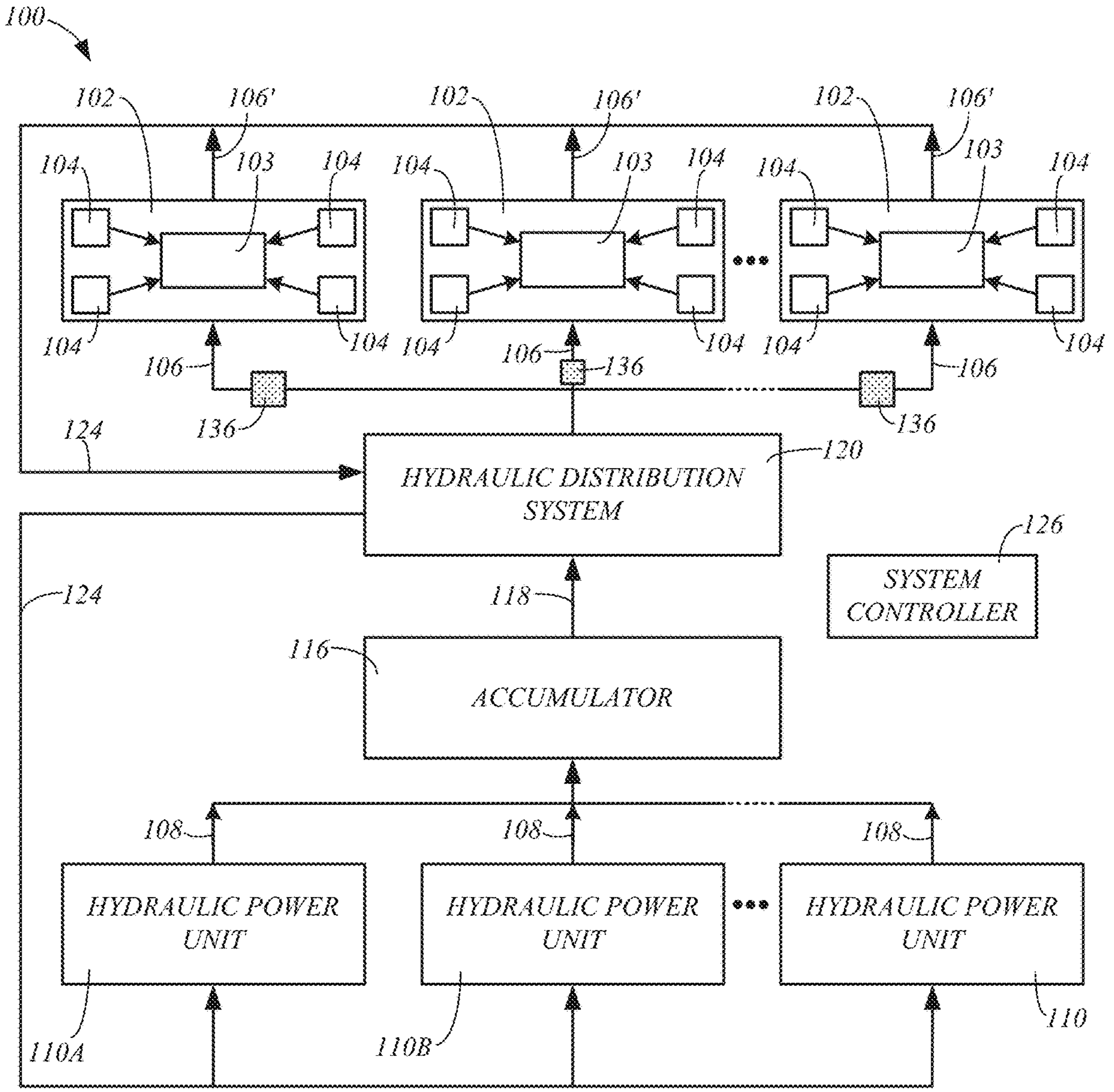
FIG. 1 is a simplified diagram of an example of a dynamic testing system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Functions recited herein may be performed by a single controller, multiple controllers, or at least one controller. As used herein, when one or more functions are described as being performed by "a controller," such as a specific controller, one or more controllers, or at least one controller, embodiments include the performance of the function(s) by a single controller or processor or multiple controllers or processors, unless otherwise specified. Furthermore, as used herein, when multiple functions are performed by at least one controller, all of the functions may be performed by a single controller, or some functions may be performed by one controller and other functions may be performed by another controller. Thus, the performance of one or more functions by at least one controller does not require that all of the functions are performed by each of the controllers.

FIG. 1 is a simplified diagram of an example of a dynamic testing system 100, in accordance with embodiments of the present disclosure. The testing system 100 may include one or more test stations 102, each of which may be configured to perform a test or conditions simulation through the application of forces and/or displacements to a test subject 103 (e.g., an automobile, a building, etc.) using hydraulic actuators 104, which are driven by flows 106 of hydraulic fluid.

The flows 106 may be provided based on hydraulic fluid flows 108 generated by one or more hydraulic power units (HPU's) 110. The system 100 may include an accumulator 116 that stores pressurized hydraulic fluid received from the HPU's 110 and discharges a hydraulic fluid flow 118 that may be used to form the flows 106 supplied to the test stations 102. The system 100 may include a distributor 120 that receives the hydraulic fluid flows from the HPU's 110 and/or the accumulator 116 and distributes the flows 106 of hydraulic fluid to the test stations 102. Other configurations of the system 100 may be used to supply the test stations 102 with the demanded hydraulic fluid flows 106.

The system 100 may be a closed system, in which the low pressure hydraulic fluid flows 106' discharged from the test stations 102 are returned, such as a combined return flow 124 through the hydraulic distribution system 120 back to the HPU's 110, for example.

A system controller 126 may operate to control various aspects of the system 100 including functions of the HPU's 110, valving (e.g., valving of the accumulator and/or distributor) and/or other aspects of the system 100 to supply the test stations 102 with the demanded hydraulic fluid flows 106.

Figure 2:
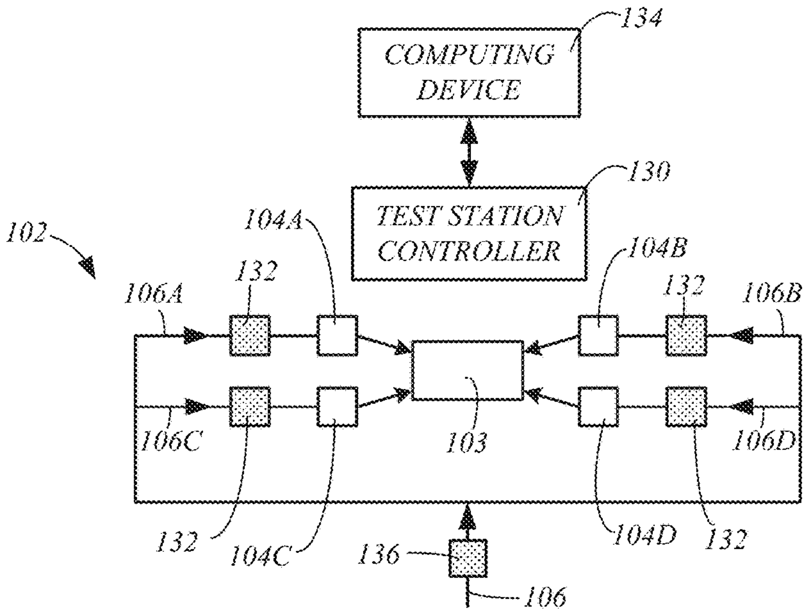
FIGS. 2 and 3 are schematic diagrams of an example of a test station, in accordance with embodiments of the present disclosure.

FIG. 2 is a schematic diagram of an example of a test station 102, in accordance with embodiments of the present disclosure. As mentioned above, the test station 102 includes a plurality of hydraulic actuators 104, such as hydraulic actuators 104A-D, that are configured to apply a force and/or drive a motion to the test subject 103. Each of the hydraulic actuators 104A-D is driven by a corresponding flow portion 106A-D of the hydraulic fluid flow 106 that is generated by one or more of the hydraulic power units 110 (FIG. 1).

Each test station 102 may include a test station controller 130, which is generally configured to perform a test on the test subject 103 based on the execution of a test program stored in a non-transitory computer-readable medium, for example. The test station controller 130 controls the actuators 104 to apply forces and/or motions in a conventional manner to the test subject 103 in response to the execution of the test program through the control of the hydraulic fluid flows 106A-D using corresponding control valves 132.

A computing device 134 may be configured to generate a graphical user interface through which a user may interact with and/or control the test station 102, the execution of a test program, view data, and/or perform other tasks, such as through a series of communications with the test station controller 130, for example.

One or more safety input valves 136, such as solenoid valves, may control the high pressure hydraulic fluid flow 106 input to the test stations 102, such as in response to a control signal from the test station controller 130, the system controller 126, or another suitable device (e.g., emergency stop), for example. Each safety input valve 136 has a fully open state that provides a mostly unrestricted pathway for the hydraulic fluid flow 106 to travel to the test station 102. The valve 136 also has a closed or substantially closed state, in which the valve 136 blocks or substantially blocks the hydraulic fluid flow 106 to the test station 102. The solenoid of the valve 136 may have a default or deenergized state corresponding to the closed or substantially closed state.

When the safety input valve 136 is in the substantially closed state, an opening in the valve 136 allows the hydraulic fluid flow 106 to travel to the test station 102. However, the flow rate of the flow 106 is substantially restricted. This limits the flow rate of the hydraulic fluid 106 to the test station 102 and to the actuators 104 regardless of the settings of the control valves 132, thus limiting the speed at which the actuators 104 can move.

The safety input valve 136 may be set to the substantially closed state by the test station controller 130, the system controller 126 or another controller of the system 100, such as in response to a detected malfunction or before operators enter the testing area where the actuators 104 and the test subject 103 are located, for example. Thus, the one or more safety input valves 136 provide a level of safety for the testing stations 102.

Higher degrees of safety are desirable in testing stations, such as safety measures that ensure that the maximum speed at which the actuators move is below a desired threshold limit when a malfunction is detected or when operators enter the testing area. However, it is generally not desirable to include redundant safety input valves 136 in the system 100 because they introduce pressure drops to the flows 106 that must be overcome through higher pressurization of the hydraulic fluid than would be necessary if the valves 136 were not present, thereby adversely affecting the efficiency at which the hydraulic fluid flows 106 can be generated. It is generally desirable for safety measures to be implemented without such adverse effects.

Figure 3:
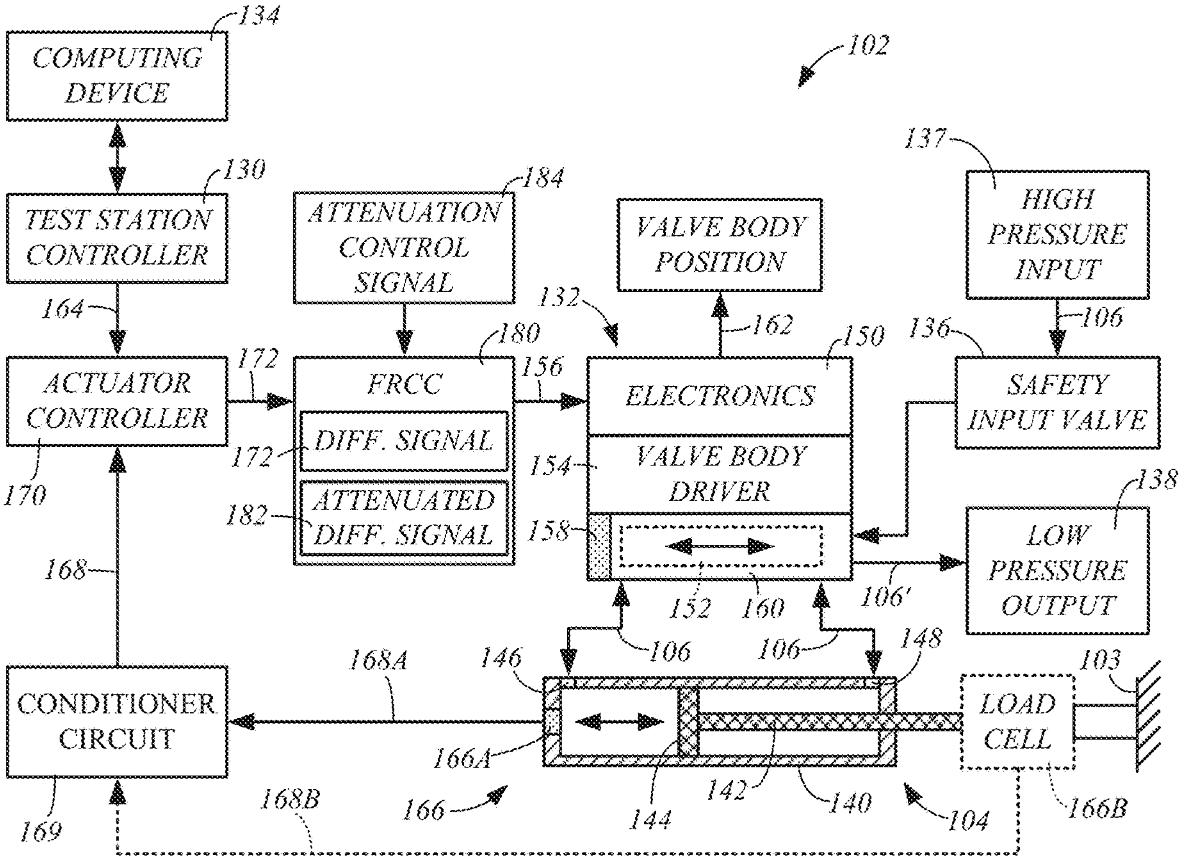

FIG. 3 is a simplified diagram of an example of a test station 102, in accordance with embodiments of the present disclosure. As discussed above, the test station 102 includes a test station controller 130 and at least one hydraulic actuator 104 and its corresponding control valve 132. While only a single hydraulic actuator 104 and control valve 132 pair is shown in FIG. 3 to simplify the illustration, it is understood that the test station 102 may include two or more actuators 104 and corresponding control valves 132, such as indicated in FIG. 2.

The control valve 132 for each hydraulic actuator 104 operates to control a flow rate (e.g., gallons per minute) of the flow 106 of hydraulic fluid to the actuator 104 that is received from a high pressure source (e.g., HPU 110) 137, and the discharge of the flow 106' to a low pressure reservoir 138 (e.g., return to reservoir of HPU 110). Additionally, the control valve 132 controls the direction of the flow through the hydraulic actuator 104 to control the actuation that is applied to the test subject 130.

In one example, the hydraulic actuator 104 includes a cylinder 140 and an actuator rod 142 having a piston 144 that is contained within the cylinder 140. The cylinder 140 includes first and second ports 146 and 148, through with the flow 106 of hydraulic fluid travels. The valve 132 controls the direction of the hydraulic fluid flow 106 through the first and second ports 146 and 148 to control the direction of movement of the actuator rod 142 and the speed at which the actuator rod 142 moves relative to the cylinder 140 based on the flow rate of the hydraulic fluid flow 106.

The control valve 132 may take on any suitable form. Examples of the control valve 132 include servo valves or solenoid valves that are configured to provide the variable flow rate and direction control described above. As indicated in FIG. 3, the control valve 103 generally includes electronics 150, a valve body 152 and a valve body driver 154. The valve body 152 has an adjustable position that controls the direction and flow rate of the hydraulic fluid flow 106. The electronics 150 are configured to control the valve body driver 154 to adjust the position of the valve body 152 in response to an actuator command signal 156. For example, the valve body 152 may take the form of a spool and the valve body driver 154 may take the form of a servo. An example of this type of control valve 132 is described in U.S. Publication No. 2016/0123355.

In some embodiments, the control valve 132 includes a position sensor 158 that is configured to detect the position of the valve body 152, such as relative to a housing 160 of the valve 132. The electronics 150 are configured to output a position signal 162 that is indicative of the detected position of the valve body 152.

During the execution of a test program, the test station controller 130 issues reference signals 164 relating to desired actuations that are to be performed by the hydraulic actuators 104 on the test subject 103. Each actuator 104 includes an actuation sensor 166 that is configured to sense a parameter of the actuation performed by the actuator 104, such as a displacement and/or a force, and issue a feedback signal 168 that is indicative of the sensed parameter. The actuation sensor 166 may comprise, for example, a displacement sensor 166A, such as a linear variable differential transformer that is configured to detect a displacement and/or movement of the actuator rod 142 relative to the cylinder 140 and produce a feedback signal 168A that is indicative of the detected displacement and/or movement, and/or a load cell 166B that is configured to detect a force applied by the actuator 104, such as to the test subject 103, and produce a feedback signal 168B that is indicative of the detected force, as indicated in FIG. 3. A conventional conditioner circuit may be used to process the signals 168A and/or 168B (e.g., amplify, filter, etc.) to produce the final feedback signal 168.

An actuator controller 170 is configured to compare the reference signals 164 and the feedback signal 168 corresponding to each actuator 104 and issue a differential signal 172 for the corresponding control valve 132. While the actuator controller 170 is illustrated in FIG. 3 as receiving a single reference signal 164 and issuing a single differential signal 172 corresponding to the depicted actuator 104, the actuator controller 170 may be configured to receive multiple reference signals 164 from the test station controller 130 for each hydraulic actuator 104 of the test station 102 and corresponding feedback signals 168, and issue differential signals 172 to control the corresponding valves 132. In a conventional test station 102, the differential signal 172 operates as the shown actuator command signal 156 to the control valve 132, which adjusts the flow rate and/or flow direction of the fluid flow 106 to produce the desired actuation.

Embodiments of the present disclosure include a flow rate control circuit (FRCC) 180 for each valve 132 that receives the differential signal 172 from the actuator controller 170 and outputs the actuator command signal 156 to the control valve 132. Alternatively, a single flow rate control circuit could be adapted to receive multiple differential signals 172 corresponding to multiple actuators 104 of the test station 102, and output actuator command signals 156 to the corresponding control valves 132. To simplify the discussion, the flow rate control circuit 180 will be described in regard to its operation with a single hydraulic actuator 104 and valve 132.

In one example, the flow rate control circuit 180 has a first state, in which the actuator command signal 156 takes the form of the differential signal 172, such as by passing the differential signal 172 as the actuator command signal 156, and a second state, in which the actuator command signal 156 takes the form of an attenuated differential signal 182. The flow rate control circuit 180 may be transitioned between the first and second states in response to a flow rate attenuation signal 184, which may be issued by the test station controller 130, the system controller 126, or from another device of the system 100, such as a user activated switch.

The flow rate of the hydraulic fluid flow 106 through the control valve 152 corresponding to the attenuated differential signal 182 form of the actuator command signal 156 is less than the flow rate of the hydraulic fluid flow 106 corresponding to the differential signal 172 form of the actuator command signal 156. Thus, when the flow rate control circuit 180 is in the first state, the control valve 152 is essentially controlled in a conventional manner by the differential signal 172.

When the flow rate control circuit 180 is in the second state, the control valve 132 is controlled to reduce the flow rate of the hydraulic fluid flow 106 and the speed of the actuation performed by the actuator 104 relative to that dictated by the differential signal 172. As a result, the flow rate control circuit 180 operates to limit the speed of the actuations performed by the actuators 104, but without imposing an additional pressure drop along the pathway of the hydraulic fluid flow 106, as in the case of adding another safety input valve 136, for example.

In some embodiments, the attenuated differential signal 182 indicates a flow rate corresponding to about a 50-95% attenuation (e.g., about 75-90% attenuation) of the flow rate of the differential signal 172, resulting in the attenuated differential signal 182 controlling the valve 132 to provide a flow 106 having a reduced non-zero flow rate. For example, when the differential signal 172 is configured to drive the valve body 152 to a position corresponding to a flow rate of 20 gallons per minute, the corresponding attenuated differential signal 182 may be configured to drive the valve body 152 to a position corresponding to a reduced, non-zero flow rate, such as 2 gallons per minute (e.g., attenuation of 90%). In one embodiment, the non-zero flow rate corresponding to the attenuated differential signal 182 is less than about 20% of the flow rate corresponding to the differential signal 172. In one embodiment, the attenuated differential signal 182 limits a maximum speed of the actuator rod 142 relative to the cylinder 140 to less than 15 millimeters per second, such as less than 10 millimeters per second.

In one embodiment, the flow rate control circuit 180 may be configured to provide about 100% attenuation of the differential signal 172 when in the second state, resulting in the control valve 132 substantially stopping the hydraulic fluid flow 106 (e.g., +/−0.05 gallons per minute) and the actuation. Thus, when the flow rate control circuit 180 is in the second state and provides 100% attenuation of the differential signal 172, the attenuated differential signal 182 drives the valve body 152 to a position that stops the flow 106 thereby clamping the position of the actuator rod 142 in place relative to the cylinder 140.

Figure 4:
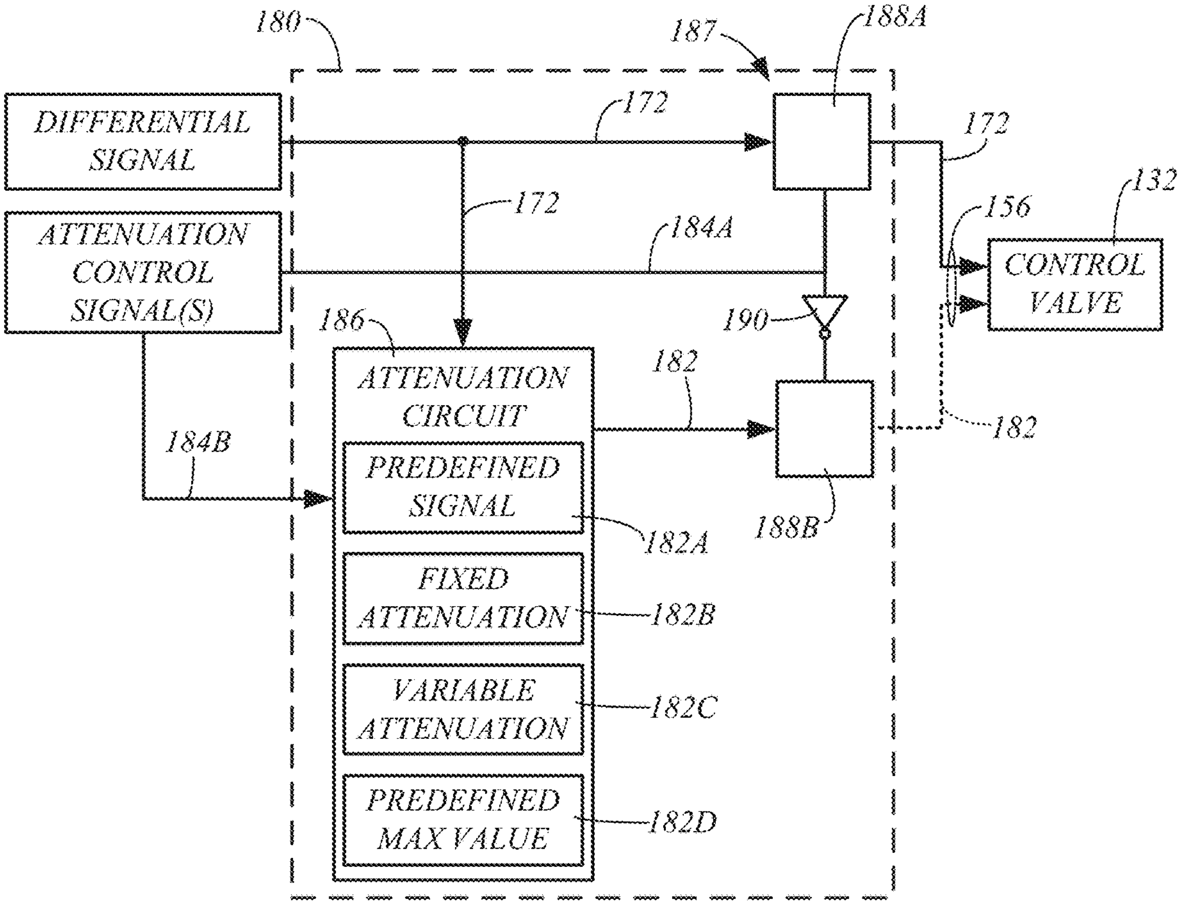
FIG. 4 is a diagram of an example of a flow rate control circuit, in accordance with embodiments of the present disclosure.

The flow rate control circuit 180 may take on any suitable form. FIG. 4 is a simplified diagram of an example of a flow rate control circuit 180, in accordance with embodiments of the present disclosure. In some embodiments, the circuit 180 includes an attenuation circuit 186 that is configured to produce the attenuated differential signal 182. The circuitry 180 may include switching circuitry 187 for selectively outputting either the differential signal 172 or the attenuated differential signal 182 as the actuator command signal 156, based on the attenuation control signal 184.

The switching circuitry 187 may take on any suitable form, such as a conventional switching circuit. In one example, the switching circuitry 187 includes a pair of switches 188A and 188B (or equivalent circuitry) that operate to pass either the differential signal 172 or the attenuated differential signal 182 as the command signal 156. The attenuation control signal or signals 184 may include a signal 184A that operates to enable or disable the switches 188A and 188B, such as by inverting the signal 184A to the switch 188B using an inverter 190. Thus, for example, one signal 184A (e.g., logic 1) may enable the switch 188A and disable the switch 188B, thereby causing the differential signal 172 to be output as the command signal 156, and another signal 184A (e.g., logic 0) may disable the switch 188A and enable the switch 188B, thereby causing the attenuated differential signal 182 to be output as the command signal 156 (dashed line).

The actuator command signal 156, the differential signal 172, and the attenuated differential signal 182 may take on various forms. In one example, each signal may take the form of a sinusoidal signal whose mean value causes the driver 154 to adjust the position of the valve body 152, which controls the direction and the flow rate of the hydraulic fluid flow 106 through the control valve 132. The direction of the flow 106 as well as the direction of the actuator rod 142 is controlled by whether the mean value is positive or negative, and the flow rate of the flow 106 is controlled by the magnitude of the mean value.

Figure 5:
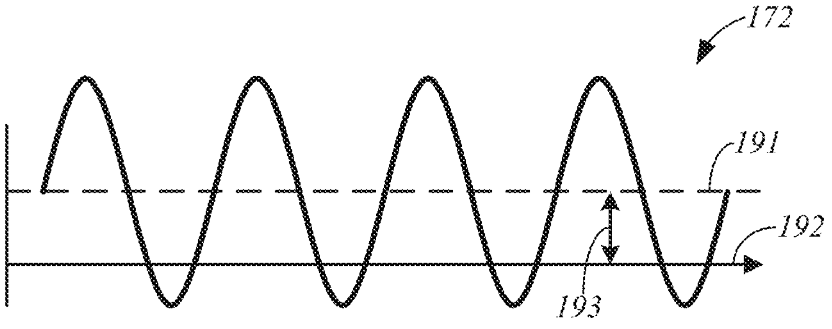
FIG. 5 is a simplified diagram of an example of a differential signal, in accordance with embodiments of the present disclosure.

FIG. 5 is a simplified diagram of an example of a sinusoidal differential signal 172 having a positive mean value 191 relative to a zero-axis 192. The positive mean value 191 drives the position of the valve body 152 to one in which the hydraulic fluid flow 106 travels in a first direction, such as into the port 146 and out of the port 148 (FIG. 3), whereas a negative mean value 191 drives the position of the valve body 152 to one in which the hydraulic fluid flow 106 travels in a second direction, such as out of the port 146 and into the port 148, for example. The position of the valve body 152 is further adjusted based on the magnitude 193 of the mean value 191, such that the flow 106 has a higher flow rate for higher magnitudes 193 and a lower flow rate for lower magnitudes 193.

Figure 6:
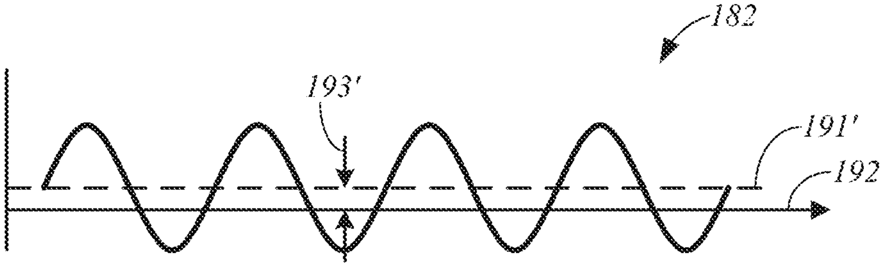
FIGS. 6 and 7 are simplified diagrams examples of attenuated differential signals, in accordance with embodiments of the present disclosure.

The attenuation circuit 186 may provide the attenuated differential signal 182 using any suitable technique. One example of an attenuated differential signal 182 is shown in FIG. 6. In some embodiments, the generated attenuated differential signal 182 may be based on an attenuation control signal 184B, as indicated in FIG. 4.

In one example, the attenuation circuit 186 outputs a predefined attenuated differential signal 182A in response to the attenuation control signal 184, regardless of the differential signal 172. The predefined attenuated differential signal 182A may have a predefined mean value 191' (either positive or negative), and magnitude 193', which directs the valve body driver 154 to move the position of the valve body 152 to a predefined location to thereby produce a predefined direction and flow rate of the hydraulic fluid flow 106. In some embodiments, the directed flow rate of the flow 106 based on the signal 182A is non-zero and limits the speed of the actuation in response to the flow 106 to less than about 15 millimeters per second, for example, as mentioned above. In other embodiments, the flow rate of the flow 106 based on the signal 182A is substantially zero.

In another example, the attenuation circuit 186 outputs an attenuated differential signal 182B corresponding to a fixed attenuation of the differential signal 172. Thus, the attenuation circuit 186 receives the differential signal 172 and uses conventional attenuation circuitry to attenuate the differential signal 172 by a fixed percentage to form the attenuated differential signal 182B. Accordingly, the attenuated differential signal 182B substantially mirrors the differential signal 172, but has a smaller mean value 191' and magnitude 193', such as indicated by the example signal 182 shown in FIG. 6. The fixed attenuation may be selected based on the size of the hydraulic actuator 104 to ensure that the flow rate of the flow 106 and the corresponding actuation speed do not exceed desired maximum values, as discussed above. The fixed percentage may correspond to a value within the ranges discussed above to produce a non-zero or substantially zero flow rate of the flow 106.

In another example, the attenuation circuit 186 outputs an attenuated differential signal 182C corresponding to a variable attenuation of the differential signal 172. Thus, the attenuation circuit 186 receives the differential signal 172 and uses conventional attenuation circuitry to attenuate the differential signal 172 by a variable percentage, which is based on the attenuation control signal 184B, to form the attenuated differential signal 182C, which may take the form of the example signal 182 shown in FIG. 6. Accordingly, the attenuated differential signal 182C substantially mirrors the differential signal 172, but has a smaller mean value 191' and magnitude 193'. The variable percentage indicated by the signal 184B may be selected based on the size of the hydraulic actuator 104 to ensure that the flow rate of the flow 106 and the corresponding actuation speed do not exceed desired maximum values, as discussed above. The variable attenuation may correspond to a value within the ranges discussed above to produce a non-zero or substantially zero flow rate of the flow 106.

Figure 7:
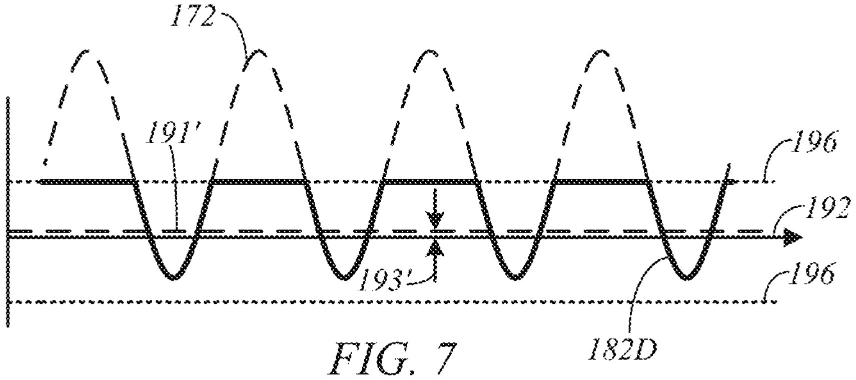

In yet another example, the attenuation circuit 186 outputs an attenuated differential signal 182D corresponding to a predefined maximum flow rate for the flow 106. FIG. 7 is a simplified diagram of an example of the attenuated differential signal 182D, in accordance with embodiments of the present disclosure. Here, the attenuation circuit 186 receives the differential signal 172 and uses conventional attenuation circuitry to truncate the differential signal 172 at predefined magnitudes 196 to form the signal 182D. As a result, the mean value 191' and magnitude 193' of the signal 182D is reduced from the mean value 191 and magnitude 193 of the differential signal 172. The predefined magnitudes 196 may be selected based on the size of the hydraulic actuator 104 to ensure that the flow rate of the flow 106 and the corresponding actuation speed do not exceed a desired maximum value, as discussed above. The predefined magnitudes 196 may correspond to attenuation values within the ranges discussed above to produce a non-zero flow rate of the flow 106.

Figure 8:
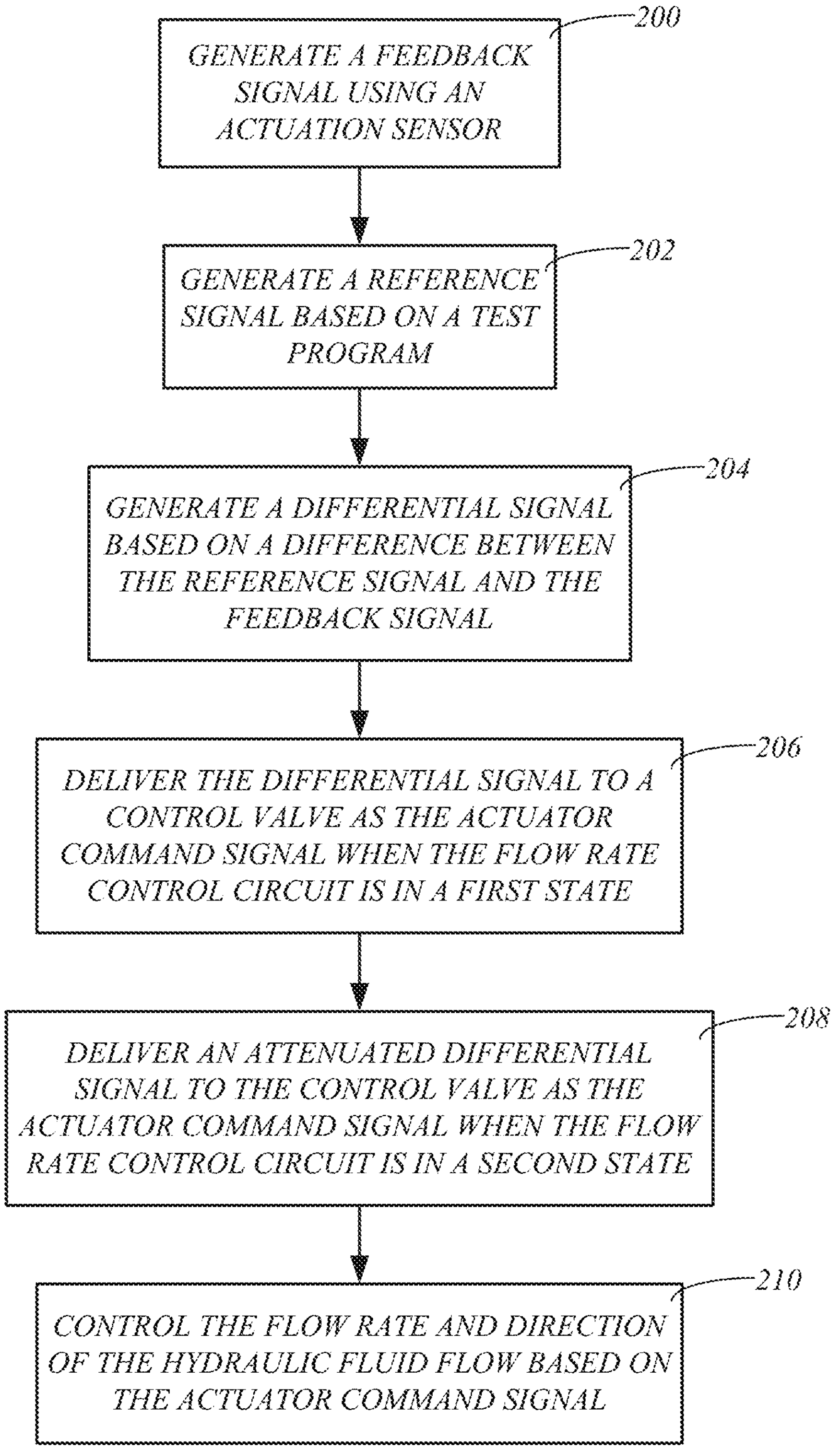
FIG. 8 is a flowchart illustrating a method of controlling a hydraulic actuator of a test station, in accordance with embodiments of the present disclosure

FIG. 8 is a flowchart illustrating a method of controlling a hydraulic actuator 104 of a test station 102, in accordance with embodiments of the present disclosure. The test station may be formed in accordance with one or more embodiments described above. While the method is described in regard to a single hydraulic actuator 104 and its control valve 132, it is understood that the method may be applied to multiple hydraulic actuators 104 of the test station 102, such as actuators 104A-D of the test station shown in FIG. 2, for example.

The method is performed using at least one controller of the system 100 (e.g., system controller 126, test station controller 130, etc.), such as based on the execution of program instructions using one or more processors of the controllers. This means that a single controller could be used to cause the steps of the method to be performed, or multiple controllers may be used to cause the steps of the method to be performed. When multiple controllers are used to cause the steps of the method to be performed, different controllers may be used to cause different steps of the method to be performed. Thus, as used herein, the phrase "at least one controller" does not require that each of the controllers performs all of the method steps or causes all of the method steps to be performed.

At 200 of the method, a feedback signal 168 is generated that indicates a parameter of an actuation by the hydraulic actuator 104 using the actuation sensor 166 (e.g., displacement sensor 166A and/or load cell 166B). This may occur during the performance of a test on a test subject 103 that is defined by a test program. As discussed above, the parameter may be a displacement, a movement or a load corresponding to the actuation.

At 202 of the method, a reference signal 164 is generated that indicates a desired actuation based on the test program using the test controller 130, and a differential signal 172 is generated, at 204, based on a difference between the reference signal 164 and the feedback signal 168 using the actuator controller 170.

The flow rate control circuit 180 is set to the first or second state by the flow rate attenuation signal 184. The flow rate control circuit 180 delivers the differential signal 172 to the control valve 132 as the actuator command signal 156 when it is in the first state, as indicated at 206 of the method. The flow rate control circuit 180 delivers the attenuated differential signal 182 to the control valve 132 as the actuator command signal 156 when it is in the second state, as indicated at 208 of the method.

At 210 of the method, the flow rate and direction of the hydraulic fluid flow 106 is controlled by the control valve 132 based on the actuator command signal 156. The flow rate corresponding to the attenuated differential signal 182 is less than the flow rate corresponding to the differential signal 172.

The degree of attenuation performed by the flow rate control circuit 180 may be in accordance with the embodiments described above, resulting in the attenuated differential signal 182 indicating a non-zero flow rate, such as less than about 20% of the flow rate indicated by the corresponding differential signal 172, or 100% attenuation to clamp the actuator rod 142 in place, for example. The non-zero flow rate indicated by the attenuated differential signal 182 may set the maximum speed at which the actuator rod 142 can move relative to the cylinder 140 to less than 15 millimeters per second, such as less than 10 millimeters per second, for example.

Figure 9:
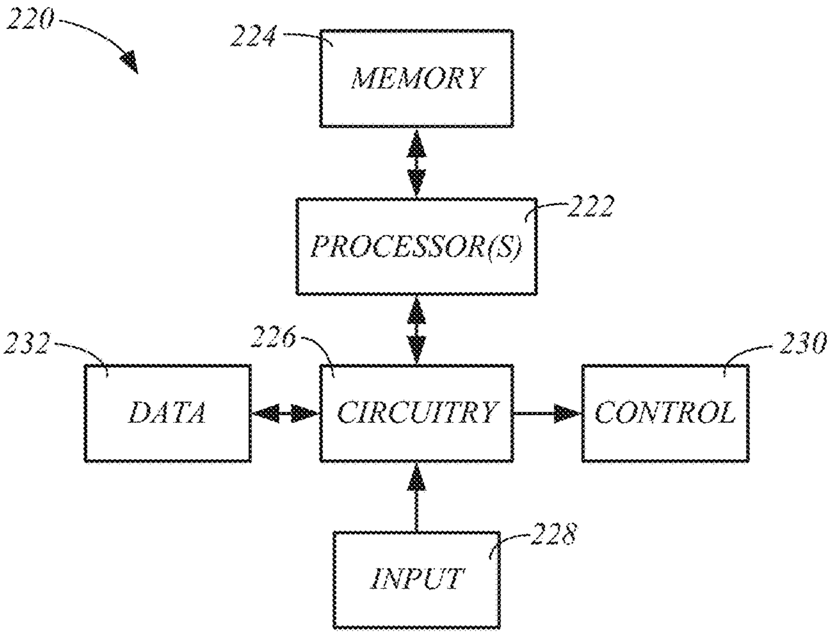
FIG. 9 is a simplified diagram of an example of a controller, in accordance with embodiments of the present disclosure.

The controllers of the system 100, such as the system controller 126, the test station controller 130, the actuator controller 170, the valve electronics 150, etc., may take on any suitable form to control the various functions described herein, such as that of the example controller 220 shown in FIG. 9. The controller 220 may include one or more processors 222 and memory 224. The one or more processors 222 are configured to perform various functions described herein in response to the execution of instructions contained in the memory 224, such as a test program, for example.

The one or more processors 222 may be components of one or more computer-based systems, and may include one or more control circuits, microprocessor-based engine control systems, and/or one or more programmable hardware components, such as a field programmable gate array (FPGA). The memory 224 represents local and/or remote memory or computer readable media. Such memory 224 comprises any suitable patent subject matter eligible computer readable media and does not include transitory waves or signals. Examples of the memory 224 include conventional data storage devices, such as hard disks, CD-ROMs, optical storage devices, magnetic storage devices and/or other suitable data storage devices. The controller 220 may include circuitry 226 for use by the one or more processors 222 to receive input signals 228 (e.g., sensor signals), issue control signals 230 (e.g., signals 164, 172, etc.) and/or communicate data 232, such as in response to the execution of the instructions stored in the memory 224 by the one or more processors 222.

Although the embodiments of the present disclosure have been described with reference to preferred embodiments, workers skilled in the art will recognize that changes may be made in form and detail without departing from the spirit and scope of the present disclosure.

What is claimed is:

1. A method of controlling a hydraulic actuator of a test station of a dynamic testing system, the test station comprising:

- a hydraulic actuator configured to drive an actuation of a test subject using a hydraulic fluid flow;
- a control valve;
- an actuation sensor;
- a test controller;
- an actuator controller; and
- a flow rate control circuit, the method comprising:

- generating a feedback signal indicative of a parameter of the actuation using the actuation sensor;
- generating a reference signal indicative of a desired actuation based on a test program using the test controller;
- generating a differential signal based on a difference between the reference signal and the feedback signal using the actuator controller;
- setting the flow rate control circuit in one of a first state and a second state based on a flow rate attenuation signal;
- delivering an actuator command signal to the control valve using the flow rate control circuit including:
  - delivering the differential signal to the control valve as the actuator command signal when the flow rate control circuit is in the first state; and
  - delivering an attenuated differential signal to the control valve as the actuator command signal when the flow rate control circuit is in the second state; and
- controlling a flow rate and a direction of the hydraulic fluid flow based on the actuator command signal,
- wherein the flow rate corresponding to the attenuated differential signal is less than the flow rate corresponding to the differential signal.

2. The method according to claim 1, wherein the flow rate corresponding to the attenuated differential signal is a non-zero flow rate.

3. The method according to claim 2, wherein the non-zero flow rate is less than about 20% of the flow rate corresponding differential signal.

4. The method according to claim 3, wherein the non-zero flow rate limits a movement of an actuator rod of the hydraulic actuator that drives the actuation to less than approximately 15 millimeters per second.

5. The method according to claim 1, wherein the flow rate corresponding to the attenuated differential signal is substantially zero and substantially clamps a position of an actuator rod that drives the actuation.

6. The method according to claim 1, wherein:

the hydraulic actuator comprises:

- a cylinder; and
- an actuator rod including a piston contained within the cylinder, wherein movement of the piston and the actuator rod relative to the cylinder drives the actuation; and the control valve comprises:

a housing including:

an inlet port coupled to a supply of high pressure hydraulic fluid;

an outlet port coupled to a low pressure return reservoir;

a first port coupled to a first working volume formed by an interior of the cylinder and the piston; and a second port coupled to a second working volume formed by the interior of the cylinder and the piston;

a valve body contained within the housing having a position that directs the hydraulic fluid flow received at the inlet port to one of the first and second ports or neither of the first and second ports, and controls a flow rate of the hydraulic fluid flow; and a valve body driver configured to adjust the position of the valve body based on the actuator command signal.

7. The method according to claim 6, wherein:

the valve body driver comprises a servo or a solenoid; and the valve body comprises a spool or a piston.

8. The method according to claim 1, wherein:

the actuation comprises a movement of the test subject;

the actuation sensor comprises a displacement sensor; and the feedback signal indicates a displacement or movement of the test subject.

9. The method according to claim 1, wherein:

the actuation comprises a force on the test subject;

the actuation sensor comprises a load cell; and the feedback signal indicates a force applied to the test subject.

10. The method according to claim 1, including generating the flow rate attenuation signal using the test controller.

11. The method according to claim 1, including attenuating the differential signal to form the attenuated differential signal using the flow rate control circuit.

12. A test station of a dynamic testing system comprising:

a hydraulic actuator configured to drive an actuation of a test subject using a hydraulic fluid flow;

a control valve configured to control a flow rate and a direction of the hydraulic fluid flow and the actuation in response to an actuator command signal;

an actuation sensor configured to generate a feedback signal that is indicative of a parameter of the actuation;

a test controller configured to generate a reference signal corresponding to a desired actuation based on a test program;

an actuator controller configured to generate a differential signal based on a difference between the reference signal and the feedback signal; and a flow rate control circuit having a first state, in which the flow rate control circuit is configured to deliver the differential signal to the control valve as the actuator command signal, and a second state, in which the flow rate control circuit is configured to deliver an attenuated differential signal to the control valve as the actuator command signal, wherein:

the flow rate control circuit is transitioned from the first state to the second state in response to a flow rate attenuation signal; and the flow rate corresponding to the attenuated differential signal is less than the flow rate corresponding to the differential signal.

13. The test station according to claim 12, wherein the flow rate corresponding to the attenuated differential signal is a non-zero flow rate.

14. The test station according to claim 13, wherein the non-zero flow rate is less than about 20% of the flow rate corresponding differential signal.

15. The test station according to claim 14, wherein the non-zero flow rate limits a movement of an actuator rod of the hydraulic actuator that drives the actuation to less than approximately 15 millimeters per second.

16. The test station according to claim 12, wherein the flow rate corresponding to the attenuated differential signal is substantially zero and clamps a position of an actuator rod that drives the actuation.

17. The test station according to claim 12, wherein:

the hydraulic actuator comprises:

a cylinder; and an actuator rod including a piston contained within the cylinder, wherein movement of the piston and the actuator rod drives the actuation; and the control valve comprises:

a valve housing including:

an inlet port coupled to a supply of high pressure hydraulic fluid;

an outlet port coupled to a low pressure return reservoir;

a first port coupled to a first working volume formed by an interior of the cylinder and the piston; and a second port coupled to a second working volume formed by the interior of the cylinder and the piston;

a valve body contained within the valve housing having a position that directs the hydraulic fluid flow received at the inlet port to one of the first and second ports or neither of the first and second ports, and controls a flow rate of the hydraulic fluid flow; and a valve body driver configured to adjust the position of the valve body based on the actuator command signal.

18. The test station according to claim 17, wherein:

the valve body driver comprises a servo or a solenoid; and the valve body comprises a spool or a piston.

19. The test station according to claim 12, wherein:

the actuation comprises a movement of the test subject;

the actuation sensor comprises a displacement sensor; and the feedback signal indicates a displacement or movement of the test subject.

20. The test station according to claim 12, wherein:

the actuation comprises a force on the test subject;

the actuation sensor comprises a load cell; and the feedback signal indicates a force applied to the test subject.

* * * * *